(12) United States Patent
Hayashikawa et al.

(10) Patent No.: US 7,046,705 B2
(45) Date of Patent: May 16, 2006

(54) GAS LASER TRANSMITTER

(75) Inventors: Hiroyuki Hayashikawa, Osaka (JP); Hitoshi Hongu, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 284 days.

(21) Appl. No.: 10/471,441

(22) PCT Filed: Sep. 26, 2002

(86) PCT No.: PCT/JP02/09930

§ 371 (c)(1),
(2), (4) Date: Sep. 10, 2003

(87) PCT Pub. No.: WO03/030313

PCT Pub. Date: Apr. 10, 2003

(65) Prior Publication Data

US 2004/0125850 A1    Jul. 1, 2004

(30) Foreign Application Priority Data

Sep. 28, 2001 (JP) ............................. 2001-300650
Sep. 28, 2001 (JP) ............................. 2001-300655

(51) Int. Cl.
*H01S 3/04* (2006.01)
*H01S 3/22* (2006.01)
*H01S 3/03* (2006.01)

(52) U.S. Cl. ............................. 372/35; 372/55; 372/61
(58) Field of Classification Search .................. 372/35
See application file for complete search history.

(56) References Cited

FOREIGN PATENT DOCUMENTS

| JP | 61-156782 | * | 7/1986 |
|---|---|---|---|
| JP | 64-42190 | | 2/1989 |
| JP | 2-148779 | * | 6/1990 |
| JP | 4-356981 | * | 12/1992 |
| JP | 5-160470 | * | 6/1993 |
| JP | 6-260708 | | 9/1994 |
| JP | 7-36464 | * | 7/1995 |

OTHER PUBLICATIONS

International Search Report corresponding to application No. PCT/JP02/09930 dated Jan. 14, 2003.

* cited by examiner

*Primary Examiner*—Armando Rodriguez
(74) *Attorney, Agent, or Firm*—RatnerPrestia (57) ABSTRACT

A laser oscillator comprises a discharge tube for exciting laser medium, at least a pair of mirrors disposed along an optical axis of laser light emitted by the laser gas excited inside the discharge tube, a laser gas passage connected with the discharge tube, laser gas circulation means for circulating the laser gas inside the laser gas passage, and heat control means for controlling heat generated in at least one of the mirrors and the laser gas circulation means.

12 Claims, 9 Drawing Sheets

GAS LASER TRANSMITTER

THIS APPLICATION IS A U.S. NATIONAL PHASE APPLICATION OF PCT INTERNATIONAL APPLICATION PCT/JP02/09930.

TECHNICAL FIELD

The present invention relates to a laser oscillator provided with temperature control means. In particular, the invention relates to the laser oscillator with capability of controlling temperature of a mirror and a laser gas circulating component.

BACKGROUND ART

Figure 7:
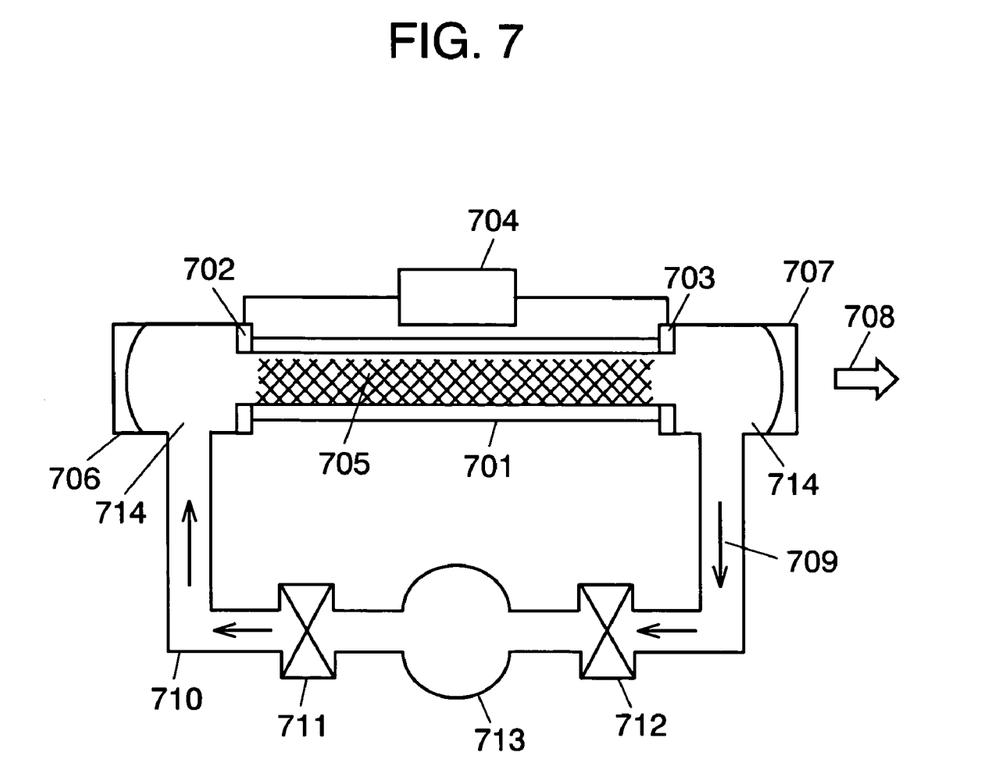
FIG. 7 is a general structural diagram of a gas laser oscillator of the prior art.

FIG. 7 to FIG. 10C illustrate gas laser oscillators of the prior art. First, FIG. 7 shows an example of general structure of an axial-flow type gas laser oscillator of the prior art. In FIG. 7, discharge tube 701 made of a dielectric material such as glass is provided with electrodes 702 and 703 on the perimetric sides thereof. Electrodes 702 and 703 are connected to power supply 704. There is discharge space 705 formed inside discharge tube 701 between electrodes 702 and 703. Final stage mirror 706 having a surface of generally all reflection and output mirror 707 having a surface of partial reflection are securely placed to both ends of discharge space 705, and they constitute an optical resonator. Final stage mirror 706 and output mirror 707 are simply called mirrors. Arrow 709 represents a direction to which laser gas flows. The laser gas circulates inside the axial-flow type gas laser oscillator at a pressure of approximately 100 to 200 Torr. Heat exchangers 711 and 712 operate at all the time to lower temperature rise of the laser gas. Blower unit 713 circulates the laser gas to produce a flow of approximately 100 m/sec. in discharge space 705. Laser gas passage 710 and discharge tube 701 are connected with laser gas ports 714.

The laser gas delivered by blower unit 713 passes through laser gas passage 710, and it is introduced into discharge tube 701 from laser gas port 714. Electrodes 702 and 703 generate electrical discharge inside discharge space 705 under the above condition. The laser gas receives energy of the electrical discharge, and it is excited in discharge space 705. The excited laser gas turns into a resonant mode by the optical resonator composed of final stage mirror 706 and output mirror 707, and laser beam 708 is output from output mirror 707. This laser beam 708 is used for laser beam machining and the like.

Figure 8:
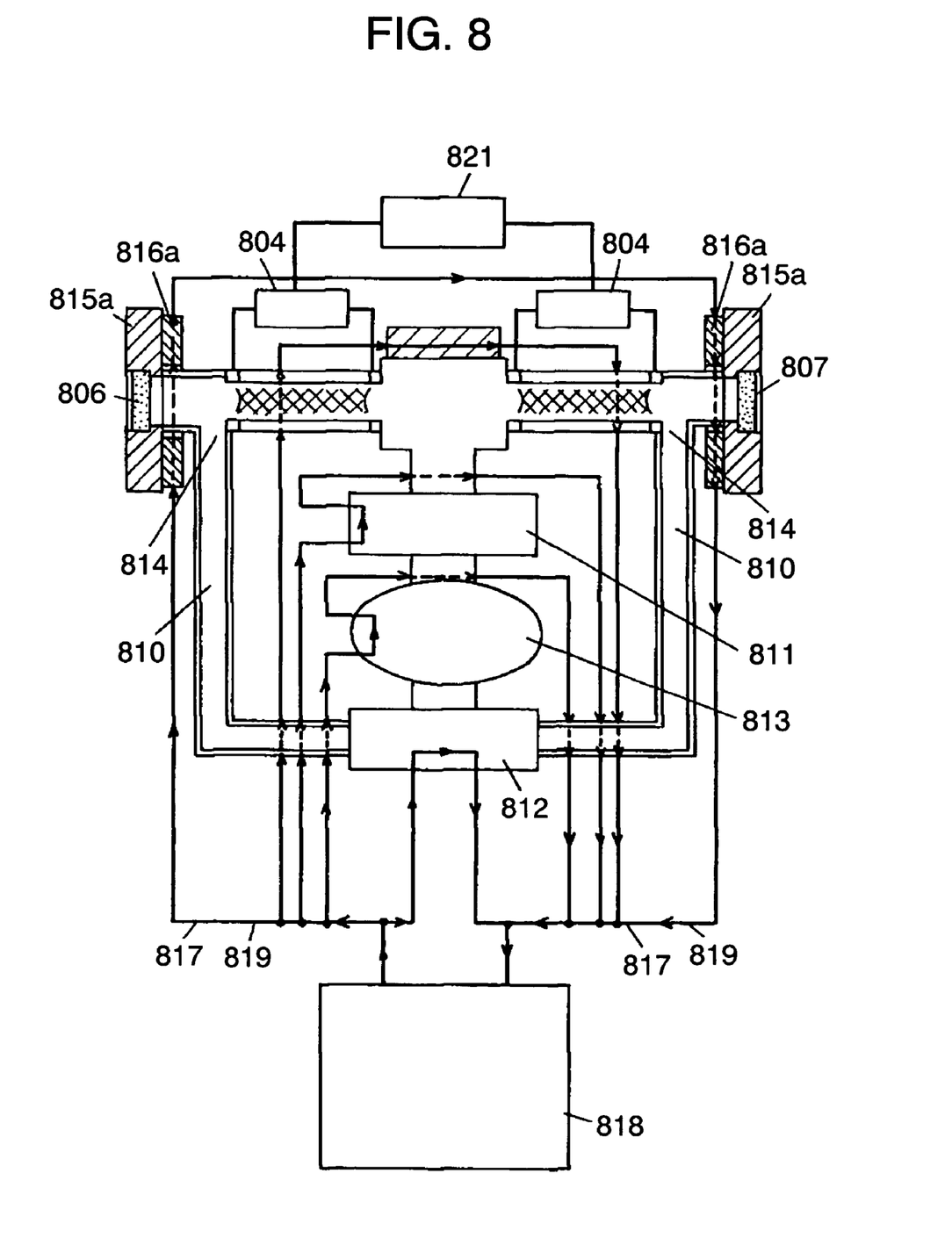
FIG. 8 is a general structural diagram of an optical bench portion of the laser oscillator of the prior art.

FIG. 8 shows a general structure of an optical bench portion of the axial-flow type laser oscillator of the prior art. Output mirror 807 is held in position by output side mirror retainer 815a, and final stage mirror 806 is held in position by final-stage side mirror retainer 815b. Mirror retainers 815a and 815b are provided with cooling plates 816a and 816b respectively, and coolant 817 keeps flowing through cooling plates 816a and 816b to remove heat at all the time. Temperature of coolant 817 is approximately 18° C., and it is introduced into the laser oscillator at a flow rate of approx. 100 l/min. from cooling system 818 provided outside of the laser oscillator.

By the way, there are two states of operation of the laser oscillator when differentiated in a general sense. They are a state in which electrical discharge takes place inside discharge space 805 and another state in which no electrical discharge is produced. It is general practice to produce electrical discharge when laser beam needs to be generated, and the electrical discharge is ceased when the laser beam is not needed.

The laser oscillator operates blower unit 813 to run continuously to keep circulation of the laser gas regardless of using or not using the laser beam, and it generates the electrical discharge each time when it produces the laser beam. It operates blower unit 813 to circulate the laser gas at all the time because it requires several tens of seconds to restart again once blower unit 813 is turned off. On the contrary, it requires only about several tens of milliseconds to stop and to restart the electrical discharge, which is an acceptable level for practical use without a problem.

Although most of the laser beam is reflected by or penetrate through final stage mirror 806 and output mirror 807, a small portion changes to heat due to absorption in them. Final stage mirror 806 and output mirror 807 generate heat when electrical discharge takes place, but they do not heat up when there is no electrical discharge because laser oscillation does not occur.

When heat is generated, they need to be cooled with coolant 817. In the actual practice, however, final stage mirror 806 and output mirror 807 are cooled at all the time while the laser oscillator is in operation regardless of generating or not generating the electrical discharge, since the cooling operation itself is not a problem even when there is no heat.

However, a problem arises when the laser oscillator is used under such an environment as high temperature and high humidity that the components being cooled collect dew condensation. While a small amount of dew condensation does not pose a problem for the regular components, it gives a serious problem for final stage mirror 806 and output mirror 807. No dew condensation occurs on final stage mirror 806 and output mirror 807 when they heat up in the presence of electrical discharge. However, they do collect dew condensation when there is no electrical discharge to produce heat in them. The dew condensation, if formed on any of final stage mirror 806 and output mirror 807, increases absorption factor of the laser beam in the condensed area, which can result in damage to the mirror, and reduction in laser output.

Figure 9:
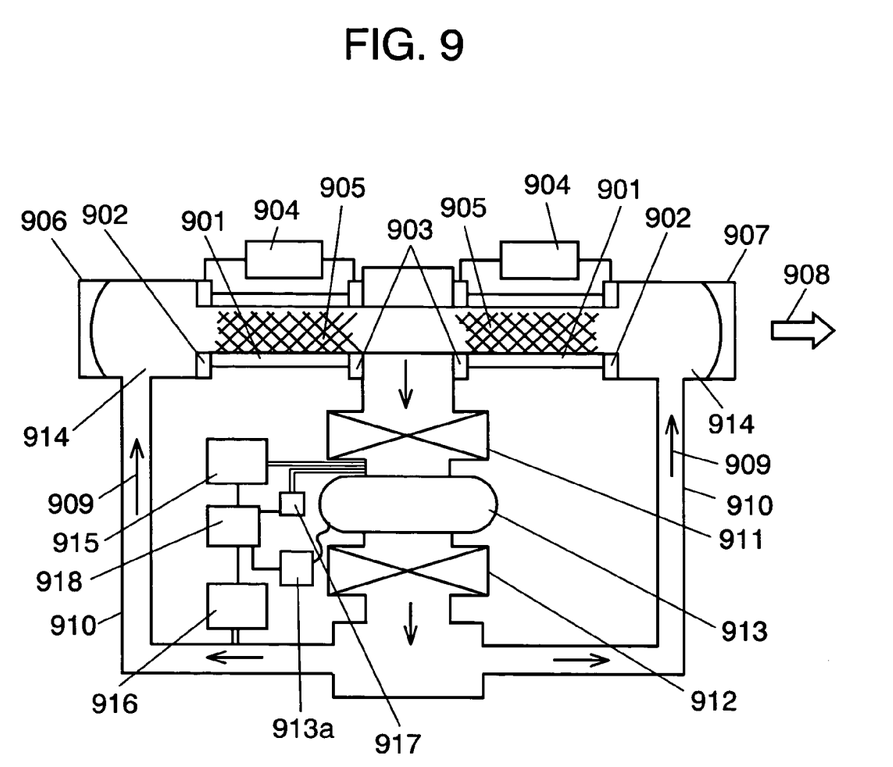
FIG. 9 is a general structural diagram of an axial-flow type gas laser oscillator of the prior art.

FIG. 9 shows a general structure of another example of the axial-flow type gas laser oscillator of the prior art. Discharge tubes 901 made of a dielectric material such as glass, electrodes 902 and 903 provided on the perimetric sides of discharge tubes 901, power supplies 904 connected to electrodes 902 and 903, discharge spaces 905 inside discharge tubes 901 provided between electrodes 902 and 903, final stage mirror 906, output mirror 907, laser gas passage 910, heat exchanger 911, another heat exchanger 912 and blower units 913 correspond respectively to discharge tubes 801 made of a dielectric material such as glass, electrodes 802 and 803 provided on the perimetric sides of discharge tubes 801, power supply 804 connected to electrodes 802 and 803, discharge spaces 805 inside discharge tubes 801 provided between electrodes 802 and 803, final stage mirror 806, output mirror 807, laser gas passage 810, heat exchanger 811, another heat exchanger 812 and blower units 813 shown in FIG. 8. In addition, a direction of laser beam 908 and flow direction 909 of laser gas also correspond to a direction of laser beam 708 and direction 709 of the laser gas in FIG. 7 respectively.

Blower unit 913 produces a gas flow of approximately 100 m/sec in discharge spaces 905. Inverter 913a controls a driving frequency for rotation of a propelling wheel of blower unit 913.

Laser gas deteriorates over time because it is dissociated by the electrical discharge. Therefore, gas discharge mechanism 915 discharges a certain amount of the laser gas at all times from laser gas passage 910, and gas supply mechanism 916 continues to supply fresh laser gas from the outside to replace the amount of discharged gas. A gas pressure inside the laser gas supply passage is monitored at all the time with gas pressure sensor 917. Gas pressure sensor 917, gas discharge mechanism 915 and gas supply mechanism 916 are connected to gas pressure controller 918. Gas pressure controller 918 maintains the gas pressure in the laser gas passage constant at all the time by controlling gas discharge mechanism 915 and gas supply mechanism 916.

However, conventional axial-flow type gas laser oscillator of the kind described above has problems, which will be discussed hereinafter.

Figure 10A:
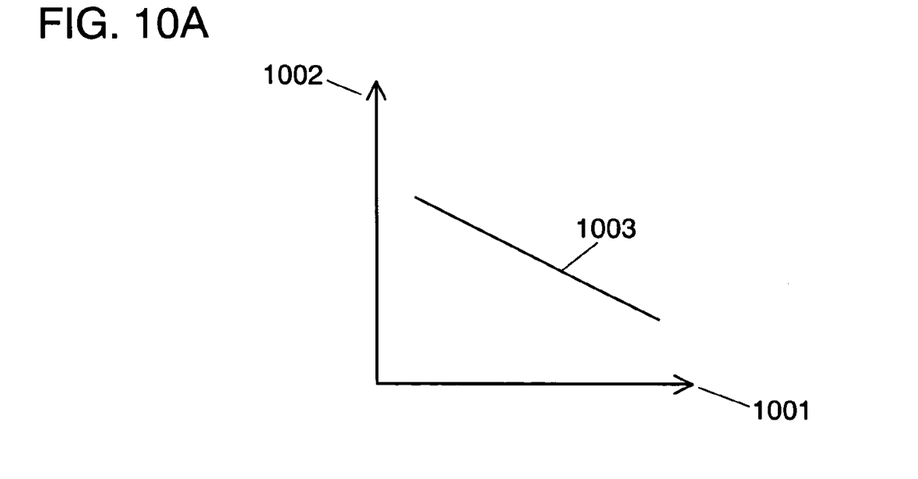
FIG. 10A is a graphical chart showing an electric current characteristic of a motor in a commonly used blower unit.
Figure 10B:
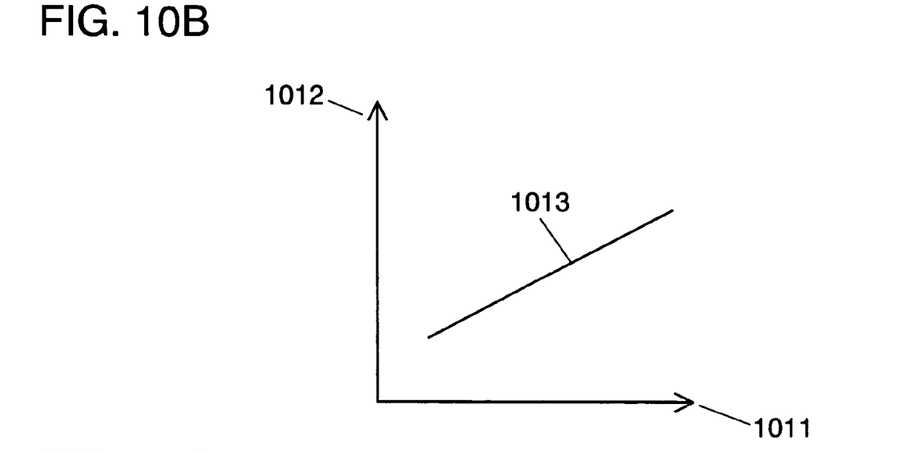
FIG. 10B is a graphical chart showing other electric current characteristic of the motor in the commonly used blower unit.
Figure 10C:
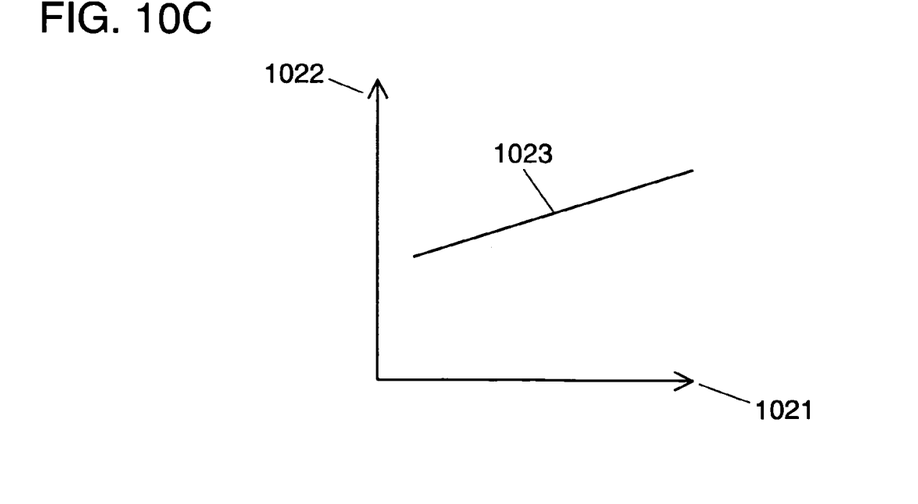
FIG. 10C is a graphical chart showing still other electric current characteristic of the motor in the commonly used blower unit.

FIG. 10A through FIG. 10C show electric current characteristics of an ordinary type motor used in any of blower units 713, 813 and 913.

FIG. 10A shows a relation between temperature of gas suctioned into any of blower units 713, 813 and 913 and electric current to the motor. Abscissa 1001 represents temperature of the gas suctioned into blower units 713, 813 and 913, and ordinate 1002 represents the electric current that flows to the motor. Line 1003 shows the relation between them.

As is obvious from FIG. 10A, the lower the temperature of the gas suctioned into blower units 713, 813 and 913, the larger the current drawn by the motor of blower units 713, 813 and 913. This is because a mass per unit volume of the gas increases with decrease in temperature of the gas, which increases both the mass and flow rate of the gas delivered per each time period from blower units 713, 813 and 913, which hence increases workload of the motor.

FIG. 10B shows a relation between pressure of the gas suctioned in blower units 713, 813 and 913 and electric current to the motor. Abscissa 1011 represents pressure of the gas suctioned into blower units 713, 813 and 913, ordinate 1012 represents the electric current that flows to the motor, and line 1013 represents the relation between them.

As shown in FIG. 10B, the higher the gas pressure to blower units 713, 813 and 913, the larger the electric current drawn by the motor. A reason of this is that a mass per unit volume of the gas increases with increase in gas pressure, which increases both the mass and flow rate of the gas delivered per each time period from blower units 713, 813 and 913, and it hence increases workload of the motor.

FIG. 10C shows a relation between driving frequency and electric current to the motor of blower units 713, 813 and 913. Abscissa 1021 represents the driving frequency of blower units 713, 813 and 913, ordinate 1022 represents the electric current to the motor, and line 1023 represents the relation between them.

As is apparent from FIG. 10C, the higher the driving frequency of blower units 713, 813 and 913, the faster the rotating speed of a propelling wheel in blower units 713, 813 and 913, and thereby the greater the workload to the motor, which also increases the current drawn by the motor.

In general, increase in the motor current of blower units 713, 813 and 913 increases heat generated in the motor, which results in temperature rise of the motor. In light of the long-term reliability, it is desirable to use a blower unit with as low an amount of motor current as practically possible, since high temperature of the motor accelerates partial deterioration of a motor coil and the like if used continuously for a long period of time.

Normally, the gas pressure inside laser gas passages 710, 810 and 910 is regulated to a predetermined pressure (e.g., approx. 20 kPa) within a range, which can provide an optimum mass and flow rate of the gas while restricting an increase in the amount of current that flows to the motor of blower units 713, 813 and 913. In addition, temperature of the gas suctioned into blower units 713, 813 and 913 is controlled to be about 40 to 50° C. under the normal operating condition, in consideration of balancing between temperature of the laser gas heated during compression by blower units 713, 813 and 913 and heating by the electrical discharge, and cooling capacities of heat exchangers 711, 712, 811, 812, 911 and 912.

Problems are not anticipated so long as blower units 713, 813 and 913 are operated under the above condition at all the time, since the amount of current to the motor is restricted to a certain limit or below, approx. 36 amperes or less for instance. However, another problem comes up in a situation where temperature around the gas laser oscillator decreases in winter or for other reasons. In most cases, the gas laser oscillator is operated only in the daytime, while it is kept not operational during the night hours. The ambient temperature goes down to 5 to 10° C., for instance, when the laser oscillator is not operating during the nighttime in winter. Therefore, temperature of the laser gas inside the gas laser oscillator also goes down to as low a temperature as about 5 to 10° C. by the time the gas laser oscillator is started in the morning. When blower units 713, 813 and 913 are driven under this condition, an amount of current to the motor goes up temporarily to approx. 40 A as compared to the regular level of about 36 A, because temperature of the gas being suctioned in blower units 713, 813 and 913 is low.

In reviewing further detail pertaining to temperature control of the gas suctioned in blower units 713, 813 and 913, it is a general practice that the gas temperature is controlled for cooling only, simply with heat exchangers 711, 712, 811, 812, 911 and 912. Any of heat exchangers 711, 712, 811, 812, 911 and 912 exchanges heat between the gas and cooling water brought in from the outside. Since temperature of the cooling water introduced from the outside is generally in the neighborhood of 15 to 20° C., it can cool the gas having temperature above 15 to 20° C. However, it cannot heat the gas if the temperature is about 5 to 10° C. In the normal operating condition, the gas temperature eventually settles to an expected level of approx. 40 to 50° C. within 10 to 20 minutes even if the gas laser oscillator is started in the low temperature condition with its gas temperature at around 5 to 10° C., because the gas is heated by the heat generated by electrical discharge and compression of the gas by blower units 713, 813 and 913, and the temperature of the motor of blower units 713, 813 and 913 decreases into a normal state without problem. However, the blower unit is operated with the motor consuming a larger current than the anticipated level for a period of about 10 to 20 minutes immediately after the start-up. When the gas laser oscillator is operated everyday in this manner, partial deterioration of motor coils and the like advances in blower units 713, 813 and 913, which consequently leads to a loss of reliability in the long-term use.

DISCLOSURE OF THE INVENTION

A laser oscillator comprises a discharge tube for exciting laser medium, at least a pair of mirrors disposed along an optical axis of laser light emitted by the laser medium excited in the discharge tube, a laser gas passage connected with the discharge tube, laser gas circulation means for circulating the laser gas in the laser gas passage and heat control means for responsively controlling heat generated in at least one of the mirrors and the laser gas circulation means.

DETAILED DESCRIPTION OF PREFERRED EMBODIMENTS

First Exemplary Embodiment

Figure 1:
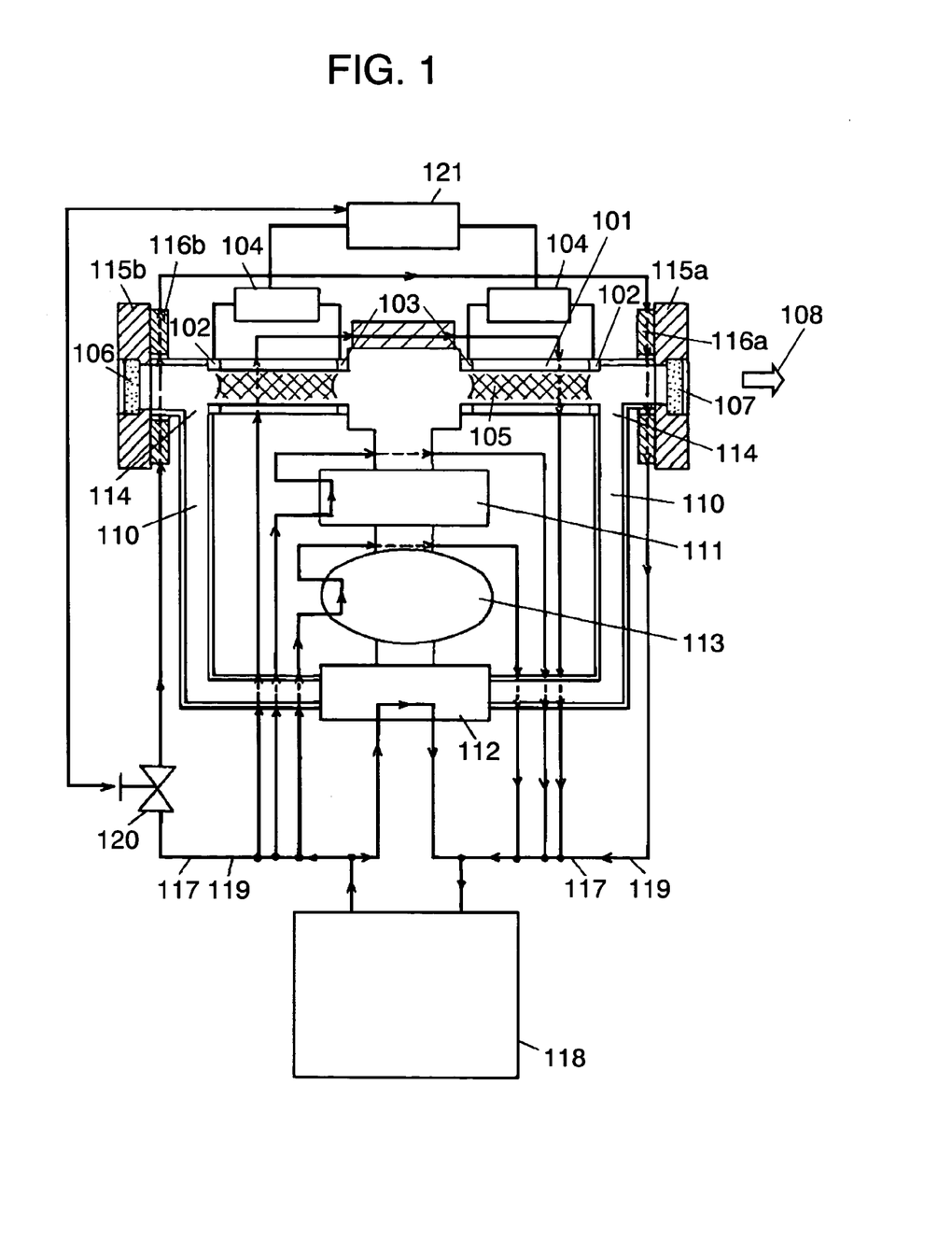
FIG. 1 is a structural diagram of a laser oscillator according to a first exemplary embodiment of the present invention.

FIG. 1 shows a structure of a laser oscillator according to the first exemplary embodiment of this invention.

In FIG. 1, discharge tubes 101 made of dielectric material such as glass are provided with electrodes 102 and 103 on the perimetric sides thereof Electrodes 102 and 103 are connected to power supplies 104. There are discharge spaces 105 formed inside discharge tubes 101 between electrodes 102 and 103. Final stage mirror 106 having a surface of generally all reflection and output mirror 107 having a surface of partial reflection are securely placed to two ends of discharge spaces 705, and they constitute an optical resonator. Laser beam 108 is output from output mirror 107. Laser gas circulates inside the gas laser oscillator. Heat exchangers 111 and 112 responsively function to control temperature of the laser gas. Blower unit 113 circulates the laser gas. Laser gas passage 110 and discharge tubes 101 are connected with laser gas ports 114.

The laser gas delivered by blower unit 113 passes through laser gas passage 110, and it is introduced into one of discharge tubes 101 from laser gas port 114. Electrodes 102 and 103 generate electrical discharge in discharge spaces 105 under the above condition. The laser gas receives energy of the electrical discharge, and it is excited inside discharge space 705. The excited laser gas turns into a resonant mode by the optical resonator composed of final stage mirror 106 and output mirror 107, and laser beam 108 is output from output mirror 107. This laser beam 108 is used for laser beam machining and the like.

Output mirror 107 is held in position by output side mirror retainer 115a, and final stage mirror 106 is held in position by final stage side mirror retainer 115b. Output mirror 107 and final stage mirror 106 generate heat therein due to reflection and penetration of the laser beam. Output side mirror retainer 115a and final stage side mirror retainer 115b are provided with cooling plates 116a and 116b, and coolant 117 flows through cooling plates 116a and 116b to responsively remove the heat.

Coolant 117 is introduced into the laser oscillator at a temperature of approx. 18° C. and a flow rate of approx. 100 l/min from cooling system 118 provided outside of the laser oscillator. Coolant 117 exchanges heat with a number of components in the laser oscillator, including cooling plates 116a and 116b, heat exchangers 111 and 112, blower unit 113, and so on, and it is returned again into cooling system 118 after the temperature goes up to approx. 20° C.

Coolant 117 is cooled down to about 18° C. in cooling system 118, and introduced again into the laser oscillator. Coolant passage 119 leading to cooling plates 116a and 116b is provided with solenoid valve 120, of which operation is controlled by controller 121.

The laser oscillator operates in a manner as described hereinafter. When the laser oscillator is activated, blower unit 113 starts operating, and the laser gas begins circulating. Electrical discharge can be initiated in this state to produce laser oscillation. While the coolant is introduced from cooling system 118 into circulation through the laser oscillator in this state, final stage mirror 106 and output mirror 107 are not cooled at this stage because solenoid valve 120 provided in coolant passage 119 to cooling plates 116a and 116b remains closed.

Electrical discharge is now generated to produce a laser beam. Generation of the electrical discharge is controlled by controller 121. Controller 121 opens solenoid valve 120 at the same time with generation of the electrical discharge, to let coolant 117 start flowing toward cooling plates 116a and 116b. When the electrical discharge is suspended, controller 121 closes solenoid valve 120 to stop the flow of coolant 117 to cooling plates 116a and 116b. However, coolant 17 continues flowing to the components other than cooling plates 116a and 116b regardless of generating or not generating the electrical discharge.

With the structure as discussed above, final stage mirror 106 and output mirror 107 are cooled only when the electrical discharge takes place, or the laser is oscillating. They are thus cooled responsively and the temperature controlled responsively only when the cooling is needed. When the mirrors are cooled in an absence of electrical discharge under the environment of high temperature and high humidity, the mirrors produce dew condensation, which can be a cause of problems such as decrease in laser output due to damage to the mirrors. Such dew condensation does not occur in the structure of this exemplary embodiment.

It may be considered to raise temperature of the coolant as an alternative measures to prevent dew condensation. As a conceivable example, the temperature of the coolant at the normal level of 18° C. may be raised to 25° C. However, the raise in temperature of the coolant results in a lowering of efficiency of heat exchangers 111 and 112, and consequent increase in the laser gas temperature. On the principle of laser oscillation, increase in the laser gas temperature lowers efficiency of the laser oscillation and laser output. It is therefore not appropriate to raise the temperature of the coolant.

There is another method, as has been tried in the past, in which a heater or the like is used to regulate temperature of only the coolant that flows to the mirrors in a manner to maintain it at a temperature above a dew point of the surrounding air. However, such a structure requires sensors for detecting the temperature and humidity as well as a temperature regulator, which increases a number of components and makes the structure complex, and it is therefore not considered practical. On the contrary, this exemplary embodiment can be considered superior both in cost and in reliability, since it is quite simple in its structure and operating principle without requiring such components as a sensor and new components.

Second Exemplary Embodiment

Figure 2:
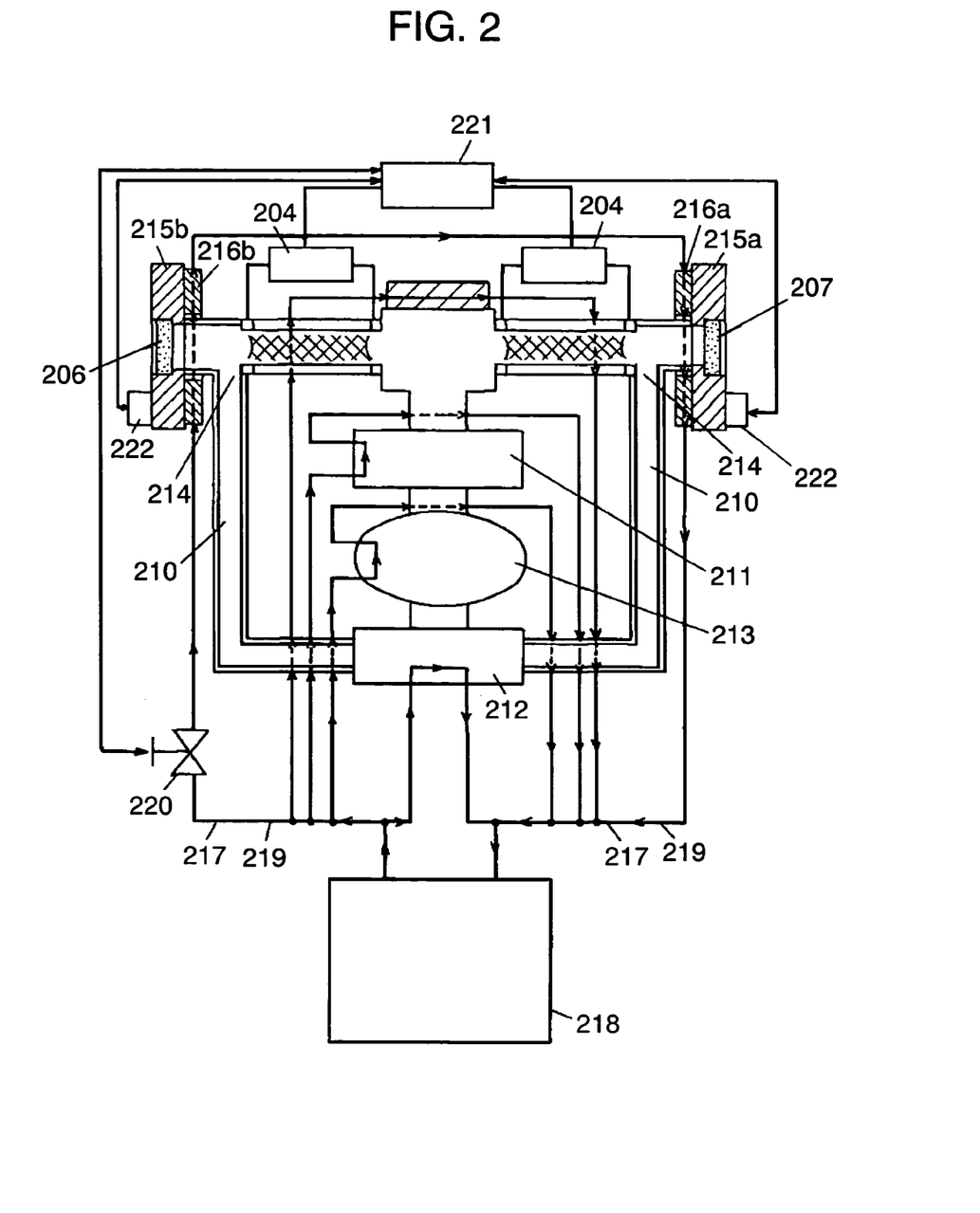
FIG. 2 is a structural diagram of a laser oscillator according to a second exemplary embodiment of the invention.

FIG. 2 shows a structure of a laser oscillator according to the second exemplary embodiment of this invention.

In FIG. 2, power supplies 204, final stage mirror 206, output mirror 207, laser gas passage 210, heat exchangers 211 and 212, blower unit 213, laser gas ports 214, output side mirror retainer 215a, final stage side mirror retainer 215b, cooling plates 216a and 216b, coolant 217, cooling system 218, coolant passage 219, solenoid valve 220 and controller 221 correspond analogously to power supplies 104, final stage mirror 106, output mirror 107, laser gas passage 110, heat exchangers 111 and 112, blower unit 113, laser gas ports 114, output side mirror retainer 115a, final stage side mirror retainer 115b, cooling plates 116a and 116b, coolant 117, cooling system 118, coolant passage 119, solenoid valve 120 and controller 121 shown in FIG. 1, respectively. Details of the individual components are therefore skipped.

This second exemplary embodiment differs from the first exemplary embodiment in a respect that heat in the mirrors can be cooled sufficiently by natural heat dissipation to the surrounding air when the laser oscillator is used by generating electrical discharge with a reduced power, that is, an output power of the laser is reduced to a low level, since the heat generated in the mirrors is small. It is not even necessary in such a case to circulate the coolant for cooling down. It is more important to avoid the possibility of dew condensation without circulating the coolant.

In the structure of FIG. 2, therefore, temperature detection means 222 such as a thermistor disposed to output side mirror retainer 215a monitors a temperature, and flow control means lets coolant 217 flow only when the temperature reaches a predetermined value, to control cooling and hence temperature of output side mirror retainer 215a and final stage side mirror retainer 215b responsively. Although the second exemplary embodiment shown in FIG. 2 requires the temperature detection means as compared to the first exemplary embodiment, it is still superior in both cost and reliability, since it does not require a temperature regulator of the type discussed in the example of the prior art.

Third Exemplary Embodiment

Figure 3:
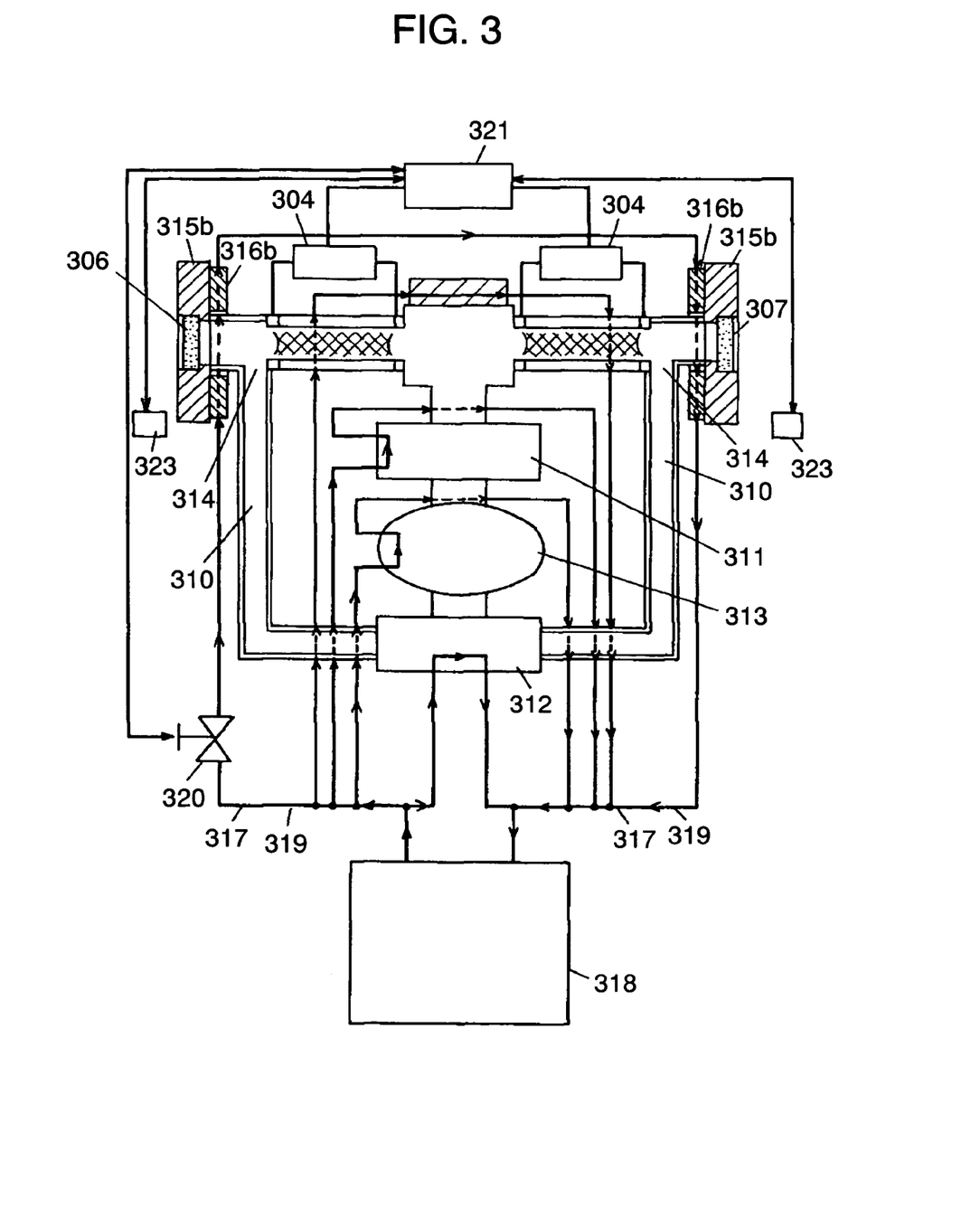
FIG. 3 is a structural diagram of a laser oscillator according to a third exemplary embodiment of the invention.

FIG. 3 shows a structure of a laser oscillator according to the third exemplary embodiment of this invention.

In FIG. 3, power supplies 304, final stage mirror 306, output mirror 307, laser gas passage 310, heat exchangers 311 and 312, blower unit 313, laser gas ports 314, output side mirror retainer 315a, final stage side mirror retainer 315b, cooling plates 316a and 316b, coolant 317, cooling system 318, coolant passage 319, solenoid valve 320 and controller 321 correspond analogously to power supplies 104, final stage mirror 106, output mirror 107, laser gas passage 110, heat exchangers 111 and 112, blower unit 113, laser gas ports 114, output side mirror retainer 115a, final stage side mirror retainer 115b, cooling plates 116a and 116b, coolant 117, cooling system 118, coolant passage 119, solenoid valve 120 and controller 121 shown in FIG. 1, respectively. Details of the individual components are therefore skipped.

This third exemplary embodiment differs from the first and the second exemplary embodiments in a respect that humidity detection means 323 are used to monitor dew points of the air around output side mirror retainer 315a and final stage side mirror retainer 315b, and temperature control is performed in a responsive manner by reducing a flow rate of coolant 317 and the like if there is a risk of dew condensation. In the structure of FIG. 3, although humidity detection means 323 such as a humidity sensor is needed, it is still superior in both cost and reliability, since it does not require a temperature regulator of the type discussed in the example of the prior art.

Any of the first through the third exemplary embodiments discussed above provides the laser oscillator which is superior in respects of the cost and reliability, capable of preventing dew condensation on the mirrors with their simple structures, and produces steady laser output at all the time.

Fourth Exemplary Embodiment

Figure 4:
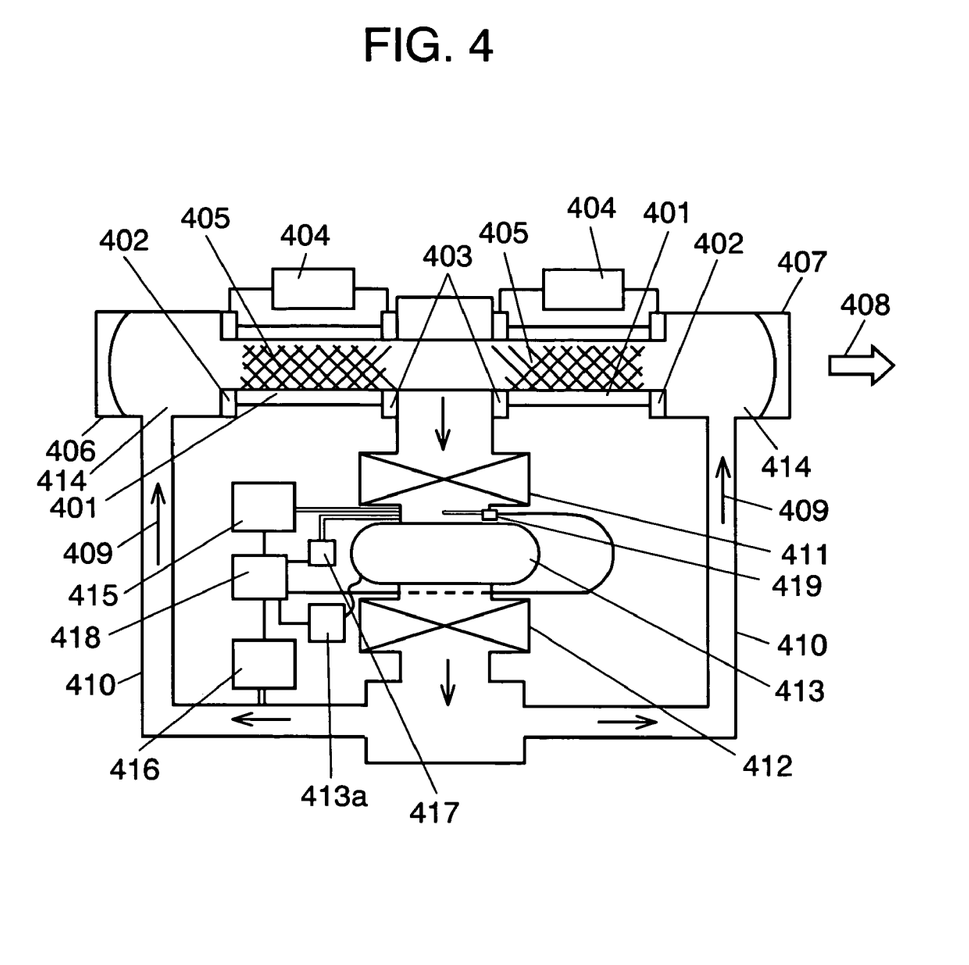
FIG. 4 is a structural diagram of a laser oscillator according to a fourth exemplary embodiment of the invention.

FIG. 4 is a structural diagram of a laser oscillator according to the fourth exemplary embodiment of this invention.

In FIG. 4, discharge tubes 401, electrodes 402 and 403, power supplies 404, discharge spaces 405, final stage mirror 406, output mirror 407, laser beam 408, laser gas passage 410, heat exchangers 411 and 412, blower unit 413 and laser gas ports 414 are analogous to discharge tubes 101, electrodes 102 and 103, power supplies 104, discharge spaces 105, final stage mirror 106, output mirror 107, laser beam 108, laser gas passage 110, heat exchangers 111 and 112, blower unit 113 and laser gas ports 114 shown in FIG. 1 respectively. Details of the individual components are therefore skipped.

Inverter 413a controls a driving frequency for rotation of a propelling wheel of blower unit 413. Arrow 409 represents a direction of the laser gas delivered by blower unit 413.

Laser gas deteriorates over time because it is dissociated by electrical discharge. Therefore, gas discharge mechanism 415 adaptively discharges a certain amount of the laser gas from laser gas passage 410, and gas supply mechanism 416 adaptively supplies fresh laser gas from the outside to replace the amount of discharged gas. A gas pressure inside the laser gas supply passage is monitored at all the time with gas pressure sensor 417. Gas pressure sensor 417, gas discharge mechanism 415 and gas supply mechanism 416 are connected to gas pressure controller 418. Gas pressure controller 418 maintains the gas pressure in the laser gas passage 410 constant at all the time by controlling gas discharge mechanism 415 and gas supply mechanism 416 in a responsive manner.

Blower unit 413 is provided with temperature sensor 419 at a suction side thereof to measure a temperature of the gas to be suctioned, and this temperature sensor 419 is connected to gas pressure controller 418.

Since a pressure and temperature of the laser gas are maintained in this manner, heat generated during operation of the blower unit for delivery of the laser gas is controlled responsively, to achieve responsive temperature control.

Figure 5:
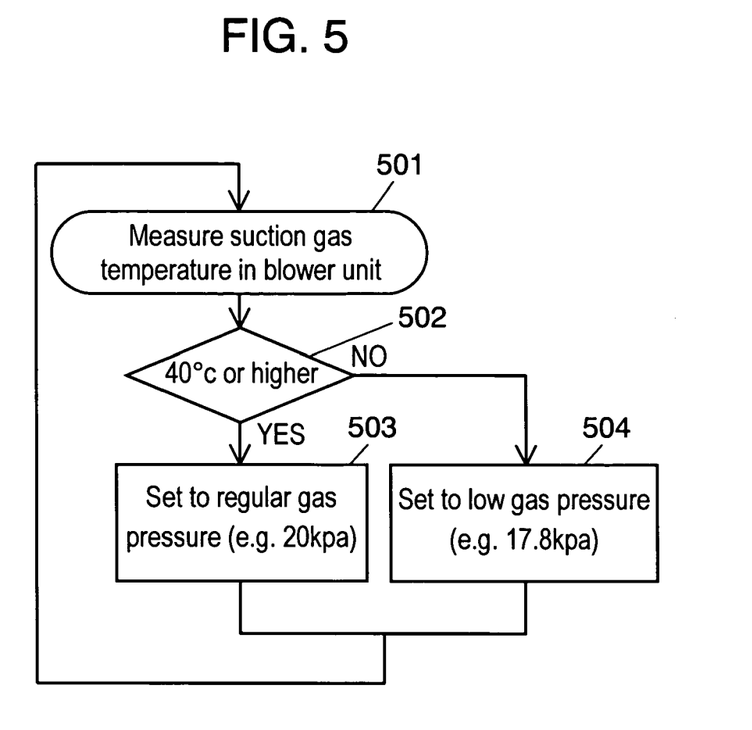
FIG. 5 is a sequence chart for controlling a gas pressure according to temperature of gas being suctioned into a blower unit of the laser oscillator shown in FIG. 4.

FIG. 5 is a flowchart showing an operation sequence of the structure shown in FIG. 4.

First, a temperature of the gas suctioned into blower unit 413 is measured in the step 501, and the measured temperature is judged in the step 502 as to whether it is above or below a predetermined temperature (e.g., 40° C.). Temperature sensor 419 keeps monitoring the temperature of the gas suctioned in blower unit 413 at all the time from the start-up of the laser oscillator. Assume that the gas laser oscillator is started in a winter morning, for example. Temperature of the laser gas inside the gas laser oscillator may be as low as about 5 to 10° C. when the gas laser oscillator is started, and temperature sensor 419 detects this temperature.

When the temperature of the gas suctioned into blower unit 413 is judged to be equal to or above the predetermined temperature (e.g., 40° C.) in the step 502, the process goes on to the step 503. In the step 503, the gas laser oscillator is operated with a pressure of the gas suctioned into blower unit 413 at the regular value (e.g., 20 kPa).

If the temperature of the gas suctioned into blower unit 413 is judged below the predetermined temperature (e.g., 40° C.) in the step 502, the process goes on to the step 504. In the step 504, the pressure of the gas suctioned into blower unit 413 is regulated to a low level (e.g., 18.7 kPa). Gas pressure controller 418 receives temperature information from temperature sensor 419, and lowers the regulating value of the gas pressure automatically by approx. 1.3 kPa. In other words, the pressure of the gas suctioned into blower unit 413 is normally in the neighborhood of 20 kPa, and this value is lowered to about 18.7 kPa. Temperature of the suctioned gas has fallen to 5 to 10° C. here, although it normally is 40 to 50° C. If blower unit 413 is driven under this condition, the current drawn by the motor increases undoubtedly, because the gas temperature is so low. For instance, although the normal electric current is about 36 A, it increases to approx. 40 A due to the low temperature of the suctioned gas. Since the pressure of the suctioned gas is lowered to 18.7 kPa from the normal value of 20 kPa, in the embodied structure of FIG. 4, the load of the motor is balanced, and the motor current is maintained consequently to the normal value of approx. 36 A.

The process is then goes back again to the step 501 from the step 503 or the step 504, and temperature of the gas suctioned into blower unit 413 is measured again. Operation of the gas laser oscillator is continued even when the process goes on through the step 504, and the process eventually advances to the step 503 when the temperature of the gas suctioned into blower unit 413 rises gradually and exceeds the predetermined value (e.g., 40° C.). The gas pressure inside laser gas passage 410 is then brought back to the normal value (e.g., 20 kPa) in the step 503.

The laser gas oscillator operated in this manner can maintain the electric current to the motor below a certain value at all the time even under such a condition as an early start-up in the morning of winter day which is likely to increase the current to the motor of blower unit 413. The load of the motor is regulated in this manner to responsively control the temperature affected by heat generated therein. As a result, this invention reduces deterioration of the motor components attributable to temperature rise of the motor, thereby providing the laser gas oscillator with high reliability for a prolonged time.

A matter of concern here is that a laser output decreases when gas pressure in laser gas passage 410 is reduced. A reduction in gas pressure inside of laser gas passage 410 means reduction in gas pressure in discharge space 405, which leads to decrease in both mass and flow rate of the laser gas that circulates through discharge space 405. Since an output of laser beam 408 produced by the laser oscillator changes in proportion to the mass and flow rate of the laser gas flowing through discharge space 405, the laser output decreases as the gas pressure decrease. However, the laser oscillator has such a characteristic that an efficiency of laser oscillation increases, and hence the laser output increases, when temperature of the laser gas decreases, according to the principle of laser oscillation. That is, the laser output has a tendency of decreasing if the gas pressure is lowered. On the other hand, since the laser oscillation efficiency increases due to decrease in temperature of the laser gas, they consequently cancel with each other, to provide a characteristic of the laser output that hardly varies in power from that of the normal condition.

Fifth Exemplary Embodiment

Figure 6:
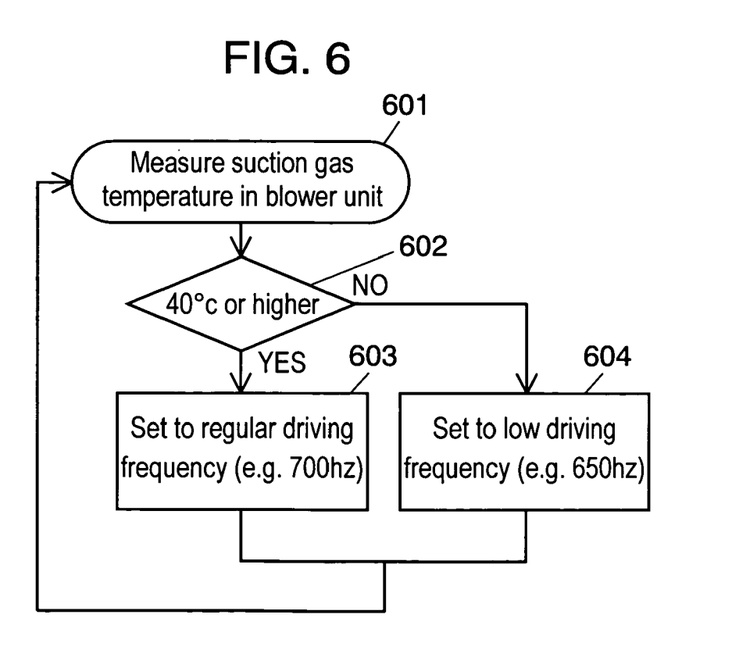
FIG. 6 is a sequence chart for responsively controlling a driving frequency of a blower unit according to temperature of gas being suctioned into the blower unit in a laser oscillator of a fifth exemplary embodiment of the invention.

FIG. 6 is a sequence chart representing the fifth exemplary embodiment of this invention, wherein a laser oscillator responsively controls a driving frequency of blower unit 413 according to temperature of gas suctioned into blower unit 413.

Because the step 601 and step 602 are analogous to the corresponding steps 501 and 502 of FIG. 5 respectively, individual explanation is not repeated here in detail.

When temperature of the gas suctioned into blower unit 413 is judged equal to or above a predetermined temperature (e.g., 40° C.) in the step 602, the process goes on to the step 603. In the step 603, blower unit 413 is operated with a normal driving frequency (e.g., 700 Hz).

If the temperature of the gas suctioned into blower unit 413 is judged below the predetermined temperature (e.g., 40° C.) in the step 602, the process goes on to the step 604. In the step 604, the driving frequency of blower unit 413 is lowered, and operated with a frequency of 650 Hz, for instance. Gas pressure controller 418 receives temperature information from temperature sensor 419, and lowers the driving frequency of blower unit 413 automatically by about 50 Hz. In other words, the driving frequency of blower unit 413 is normally 700 Hz, but this figure is lowered to approx. 650 Hz. Assuming that the laser oscillator is started early in the morning of a winter day, temperature of the suctioned gas has fallen to 5 to 10° C., although it should be normally 40 to 50° C. If blower unit 413 is driven under this condition, the current consumed by the motor increases because the gas temperature is so low. For instance, although the normal electric current is about 36 A, it increases to approx. 40 A because of the low temperature of the suctioned gas. Since the driving frequency of blower unit 413 is lowered to 650 Hz from the normal frequency of 700 Hz, in the structure of FIG. 4, the load of the motor is balanced, and the motor current is maintained consequently to the normal value of approx. 36 A.

The process is then goes back again to the step 601 from the step 603 or the step 604, and temperature of the gas suctioned into blower unit 413 is measured. Operation of the gas laser oscillator is continued even when the process goes on through the step 604, and the process eventually advances to the step 603 when the temperature of the gas suctioned into blower unit 413 rises gradually and exceeds the predetermined value (e.g., 40° C.). The driving frequency of blower unit 413 is then brought back to the normal frequency (e.g., 700 Hz).

The operation shown in FIG. 6 can thus maintain electric current to the motor below a certain value at all the time even under such a condition as an early start-up in the morning of winter day that is likely to increase the current to the motor of blower unit. The load of the motor is regulated in this manner to responsively control the temperature affected by heat generated therein. As a result, this invention reduces deterioration of the motor components attributable to temperature rise of the motor, thereby providing the laser gas oscillator with high reliability for a long period of time.

A matter of concern here is that a laser output decreases when the driving frequency of blower unit 413 is lowered. A low driving frequency of blower unit 413 means decrease in gas volume delivered by blower unit 413, which leads to decrease in both mass and flow rate of the laser gas that flows through discharge space 405. Since an output of laser beam 408 produced by the laser oscillator varies in proportion to the mass and flow rate of the laser gas flowing through discharge space 405, the laser output decreases as the driving frequency of blower unit 413 is lowered. However, the laser oscillator has such a characteristic that an efficiency of laser oscillation increases, and hence the laser output increases, when temperature of the laser gas decreases, according to the principle of laser oscillation. That is, the laser output has a tendency of decreasing if the driving frequency of blower unit 413 is lowered. On the other hand, the laser oscillation efficiency increases due to decrease in temperature of the laser gas. In consequence, they cancel with each other, so as to provide a characteristic of the laser output that hardly varies in power from that of the normal condition.

As described explicitly, this fifth exemplary embodiment can provide the gas laser oscillator with high reliability, which can be used steadily for a long period of time.

INDUSTRIAL APPLICABILITY

A gas laser oscillator of this invention has capability of controlling heat and temperature responsively by overcoming a variety of troubles attributable to temperature changes, and providing high reliability for long term of steady operation.

The invention claimed is:

1. A laser oscillator comprising:
    a discharge tube for exciting laser gas;
    at least a pair of mirrors disposed along an optical axis of laser light emitted by the laser gas excited in said discharge tube;
    at least a pair of mirror retainers for retaining said oair of mirrors individually;
    a laser gas passage in connection with said discharge tube;
    laser gas circulation means for circulating the laser gas in said laser gas passage and said discharge tube; and
    heat control means for controlling heat generated in at least one of said mirrors and said laser gas circulation means,
    wherein said heat control means comprises:
        a first coolant passage provided for cooling said laser gas circulation means;
        a second coolant passage provided for cooling said pair of mirror retainers;
        a cooling element for supplying coolant to said first coolant passage and said second coolant passage, and circulating said coolant; and
        a solenoid valve provided in said second coolant passage, and adjusting flow rate of said coolant of said second coolant passage.

2. The laser oscillator according to claim 1, wherein said flow rate of said coolant of said second coolant passage is restricted when the laser light is not emitted.

3. The laser oscillator according to claim 1, wherein said flow rate control means restricts flow of said coolant of said second coolant passage when heat is not generated in any of said pair of mirror retainers.

4. The laser oscillator according to claim 3, further comprising temperature detection means disposed to any of said pair of mirror retainers, wherein said temperature detection means detects temperature generated in any of said pair of mirror retainers, and said flow rate of said coolant of said second coolant passage is restricted based on a result of detection by said temperature detection means.

5. The laser oscillator according to claim 1, further comprising humidity detection means disposed in the vicinity of any of said pair of mirror retainers, wherein said flow rate of said coolant of said second coolant passage is restricted when humidity is equal to or higher than a predetermined level.

6. The gas laser oscillator according to claim 1, wherein said laser gas circulation means is provided with a blower unit disposed to said laser gas passage, and
    further comprising:
        a first temperature sensor for measuring a temperature of the laser gas suctioned by said blower unit;
        a gas supply mechanism for supplying laser gas into said laser gas passage;
        a gas discharge mechanism for discharging the laser gas from said laser gas passage; and
        gas pressure controlling means for controlling a pressure of the laser gas inside said laser gas passage based on a signal from said first temperature sensor.

7. The gas laser oscillator according to claim 6, wherein said gas pressure controlling means comprises a controller for controlling said supply mechanism and said discharge mechanism.

8. The gas laser oscillator according to claim 1, wherein said laser gas circulation means is provided with a blower unit disposed to said laser gas passage, and
    further comprising:
        a temperature sensor for measuring a temperature of the laser gas suctioned by said blower unit; and
        frequency control means for controlling a driving frequency of said blower unit based on a signal from said temperature sensor.

9. The gas laser oscillator according to claim 8, wherein said frequency control means includes an inverter for controlling said blower unit.

10. The laser oscillator according to claim 2, wherein said flow rate of said coolant of said second coolant passage is restricted when heat is not generated in any of said pair of mirror retainers.

11. The laser oscillator according to claim 2, further comprising humidity detection means disposed in the vicinity of any of said pair of mirror retainers, wherein said flow rate of said coolant of said second coolant passage is restricted when humidity is equal to or higher than a predetermined level.

12. The laser oscillator according to claim 4, further comprising humidity detection means disposed in the vicinity of any of said pair of mirror retainers, wherein said flow rate of said coolant of said second coolant passage is restricted when humidity is equal to or higher than a predetermined level.

* * * * *

UNITED STATES PATENT AND TRADEMARK OFFICE
CERTIFICATE OF CORRECTION

PATENT NO. : 7,046,705 B2 Page 1 of 1
APPLICATION NO. : 10/471441
DATED : May 16, 2006
INVENTOR(S) : Hiroyuki Hayashikawa et al.

It is certified that error appears in the above-identified patent and that said Letters Patent is hereby corrected as shown below:

Column 11

At line 47, "oair" should read -- pair --.

Signed and Sealed this

Sixteenth Day of January, 2007

JON W. DUDAS
*Director of the United States Patent and Trademark Office*